United States Patent Office 3,743,644
Patented July 3, 1973

3,743,644 7-[D-(α-AMINO-α-PHENYL-, 2-THIENYL- AND 3-THIENYL-ACETAMIDO)] - 3-[S-(ISOTHIAZOL-3-, 4- AND 5-YL)CARBONYL]THIOMETHYL-3-CEPHEM-4-CARBOXYLIC ACIDS

John Michael Essery and Lee Cannon Cheney, Fayetteville, N.Y., assignors to Bristol-Myers Company, New York, N.Y.

No Drawing. Filed Feb. 28, 1972, Ser. No. 230,030
Int. Cl. C07d *99/24*
U.S. Cl. 260—243 C 50 Claims

ABSTRACT OF THE DISCLOSURE

7-[D-(α-amino-α-phenyl-, 2-thienyl- and 3-thienyl-acetamido)]-3-[S-(isothiazol-3, 4-, and 5-yl)carbonyl]thiomethyl-3-cephem-4-carboxylic acids and their nontoxic, pharmaceutically acceptable salts are valuable as antibacterial agents, as nutritional supplements in animal feeds, as agents for the treatment of mastitis in cattle and as therapeutic agents in poultry and animals, including man, and are especially useful in the treatment, particularly by oral administration, of infectious diseases caused by many-Gram-positive and Gram-negative bacteria. Also included in this invention are the corresponding pivaloyloxymethyl, acetoxymethyl, methoxymethyl, acetonyl and phenacyl esters of such acids and their nontoxic, pharmaceutically acceptable acid addition salts.

BACKGROUND OF THE INVENTION

(1) Field of the invention

The cephalosporins of the present invention possess the usual attributes of such compounds and are particularly useful in the treatment of bacterial infections by oral administration.

(2) Description of the prior art (A) Cephalosporins in general.—Cephalothin and cephaloridine are well-known antibacterial agents; see U.S. Pats. 3,218,318; 3,449,338 and 3,498,979. The literature also contains considerable data on the activity of cephaloglycin and cephalexin; see U.S. Pats. 3,303,193, 3,507,861 and 3,560,489 and Great Britain 985,747 and 1,054,806. Newer cephalosporins include cefazolin and cephapirin; see U.S. Pat. 3,516,997 [and also Netherlands 6805179 (Farmdoc 34,328) and South Africa 68/4,513] and U.S. Pat. 3,422,100.

The literature on cephalosporins has been reviewed by E. P. Abraham, Quart. Rev. (London) 21, 231 (1967) by E. Van Heyninger, Advan. Drug Res., 4, 1–70 (1967) and briefly in Annula Reports in Medicinal Chemistry, Academic Press, Inc., 111 5th Ave., New York, N.Y., 10003, by L. C. Cheney on pages 96 and 97 (1967) and by K. Gerzon and R. B. Morin on pages 90–93 (1968) and by Gerzon on pages 79–80 (1969) and by L. H. Conover on pages 101–102 (1970). New cephalosporins are frequently reported at the annual Interscience Conference on Antimicrobial Agents and Chemotherapy as illustrated by Sassiver et al., Antimicrobial Agents and Chemotherapy 1968, American Society for Microbiology, Bethesda, Md., pages 101–114 (1969) and by Nishida et al., ibid., 236–243 (1970). Two excellent reviews are The Cephalosporins; Microbiological, Chemical and Pharmacological Properties and Use in Chemotherapy of Infection L. Weinstein and K. Kaplan, Annals of Internal Medicine, 72, 729–739 (1970) and Structure Activity Relationships Among Semisynthetic Cephalosporins, M. L. Sassiver and A. Lewis, Advances in Applied Microbiology, edited by D. Perlman, 13, 163–236 (1970), Academic Press, New York. Two more recent reviews are β-Lactam Antibiotics: Their Physicochemical Properties and Biological Activities in Relation to Structure, J. P. Hou and J. W. Poole, J. Pharmaceutical Sciences, 60(4), 503–532 (April 1971) and Chemistry of Cephalosporin Antibiotics, R. B. Morin and B. G. Jackson, Fortschr. Chem. Org. Naturst, 28, 343–403 (1970) which includes a section on nucleophilic displacement of the acetate group at pages 370–373.

The preparation of various 7-[α-amino-arylacetamido]-cephalosporanic acids and the corresponding desacetoxy compounds in which aryl represents unsubstituted or substituted phenyl or 2- or 3-thienyl is described, for example, in British specifications 985,747, 1,017,624, 1,054,806 and 1,123,333, in Belgium Pat. 696,026 (Farmdoc No. 29,494), in U.S. Pats. 3,311,621, 3,352,858, 3,489,750, 3,489,751, 3,489,752, 3,518,260 and 3,575,969, in Japanese Pat. 16,871/66 (Farmdoc 23,231), by Spencer et al., J. Med. Chem., 9(5), 746–750 (1966), by Ryan et al., J. Med. Chem., 12, 310–313 (1969) and by Kurita et al., J. Antibiotics (Tokyo) (A) 19, 243–249 (1966) and see also U.S. Pat. 3,485,819. British specification 1,073,530 includes a disclosure of the preparation of such compounds by acylation of sililyated 7–ACA.

Netherlands Pats. 6811676 (Farmdoc 36,349) and 6812382 (Farmdoc 36,496) and U.S. Pats. 3,489,750 and 3,489,751 disclose ring-substituted cephaloglycins.

(B) 3 - thiomethylcephalosporins.—Various cephalosporins, including cephalosporin C on occasion but not cephaloglycin, have been reacted with nucleophilic, aromatic mercaptans to produce compounds having the structure

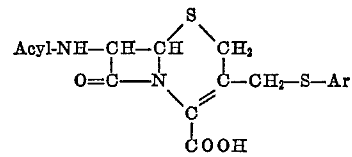

In U.S. Pat. 3,278,531 Ar is phenyl or certain substituted phenyls or certain aromatic heterocyclic rings named, for example, in column 5. Similar nucleophiles, e.g. 2-mercaptopyrimidines, are disclosed in U.S. 3,261,832 and Great Britain 1,101,422 and U.S. 3,479,350 and U.S. 3,502,665, all issued to Glaxo. A parallel disclosure is found in Great Britain 1,109,525 to Ciba, e.g. in definition "h" for $R_3$. Additional nucleophiles of this type were disclosed by Fujisawa in Belgium 714,518 (Farmdoc 35,307; Netherlands 6806129 and South Africa 2,695/68), in Canada 818,501 (Farmdoc 38,845), in Great Britain 1,187,323 (Farmdoc 31,936; Netherlands 6714888), in U.S. 3,530,123 and in U.S. 3,516.997 (Farmdoc 34,328; Netherlands 6805179) which includes the compound named cefazolin, which has a tetrazolylacetyl sidechain on the 7-amino group and a 5-methyl-thiadiazolylthiomethyl group at the 3-position and is described at some length in the scientific literature, e.g. in Antimicrobial Agents and Chemotherapy—1969, American Society for Microbiology, Bethesda, Md., at pages 236–243 and in J. Antibiotics (Japan) 23(3), 131–148 (1970).

Replacement of the 3-acetoxy group of a cephalosporin by various heterocyclic thiols has been disclosed in U.S. 3,563,983 and in Netherlands 7005519 (Farmdoc 80,188R) where the sidechains were, for example, 7-α-aminophenylacetamido and typical heterocyclic thiols were 2-methyl-1,3,4-thiadiazole-5-thiol and 1-methyl-1,2,3,4-tetrazole-5-thiol.

Various cephalosporins having the structure

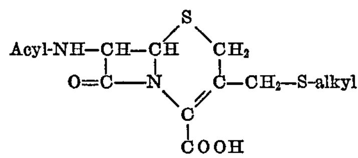

in which acyl represents various sidechains including α-aminophenylacetyl have been described in some of the above and by Glaxo in Belgium 734,532 (Farmdoc 41,-619) and in Belgium 734,533 (Farmdoc 41,620) and by Lilly in Belgium 743,754 (Farmdoc 41,150R).

Cephalosporins having the structure

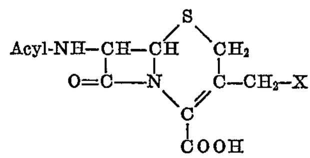

where X includes

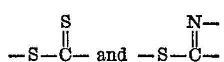

are disclosed in many patents including some of the above and in U.S. 3,239,516, 3,239,515, 3,243,435, 3,258,461, 3,431,259, 3,446,803, 3,278,531, 3,261,832 and 3,573,298.

Related publications in the scientific literature include J. Med. Chem. 8, 174–181 (1965) and J. Chem. Soc. (London) 1595–1605 (1965), 5015–5031 (1965) and 1959–1963 (1967).

(C) 3-acylthiomethylcephalosporins

The following publications and patents disclose certain additional 7–ACA derivatives containing a 3-acylthiomethyl moiety (in which phenyl is abbreviated as Ph):

(1) G. F. H. Green, J. E. Page, and S. E. Staniforth, J. Chem. Soc., 1595–605 (1965). This reference gives the proton magnetic resonance spectra of the 3-benzoylthiomethyl derivative of cephalothin.

Cocker et al., J. Chem. Soc., 1142–1151 (1966) adds thiopicolinyl and references Belgium 650,444.

(2) J. D. Cocker et al., J. Chem. Soc., 5015–31 (1965) discloses compounds having the structure

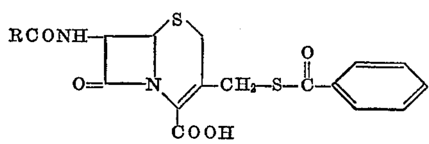

wherein R has the following meanings: $PhCH_2$—,

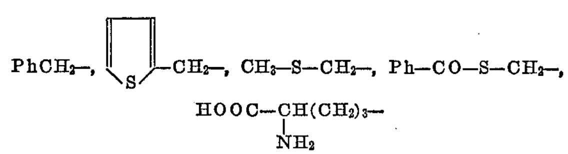

(3) Glaxo's U.S. 3,261,832 discloses compounds having the structure

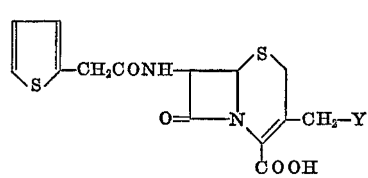

wherein R has the following meanings:

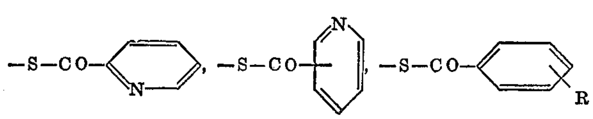

where R is $CH_3O$—, —$NO_2$, —CN, $CH_3S$—,

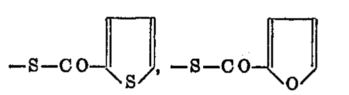

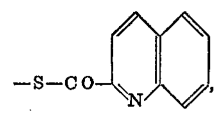

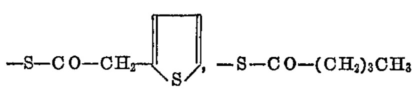

Equivalents are Netherlands 6408066 (Farmdoc 15,534) and Great Britain 1,101,424.

(4) Glaxo's Netherlands 6506818 (Farmdoc 19,360) discloses the reaction

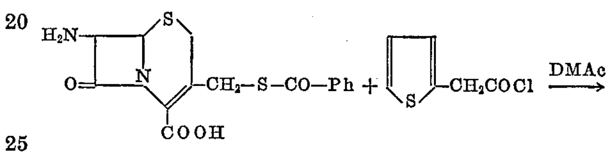

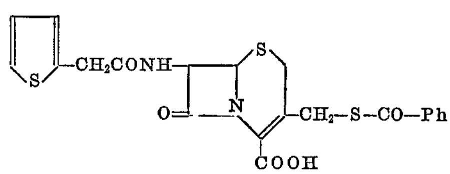

An equivalent is U.S. 3,502,665.

(5) Glaxo's Netherlands 6411521 [Chem. Abstr., 63: 13281d (1965)] discloses the reaction

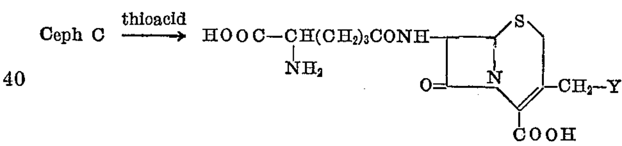

Equivalents are Great Britain 1,101,422 and Canada 796,747 (Farmdoc 17,362).

(6) Ciba's U.S. 3,555,017 discloses compounds having the structure

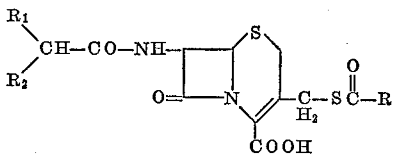

$R_1$ and $R_2$=halogen.

As usual in Ciba's patents directed primarily to novel sidechains at the 7-position, the R group above is defined broadly as the residue of a carboxylic acid and may be illustrated by phenyl, as the residue of thiobenzoic acid. Equivalents are Belgium 708,241 (Farmdoc 33,276), Great Britain 1,211,747 and French 1,575,554.

(7) Ciba's British 1,211,718 discloses compounds having the structure

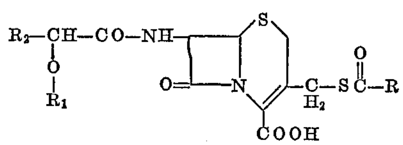

R as in 6 above

Equivalents are Belgium 708,311 (Farmdoc 33,277) and U.S. 3,557,104.

(8) Ciba's Belgium 751,526 (Farmdoc 90,178R) discloses compounds having the structure

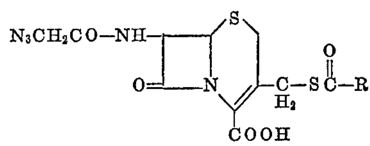

R as in 6 above.
An equivalent is Netherlands 7008237.

(9) Ciba's South Africa 69/8,436 discloses compounds having the structure

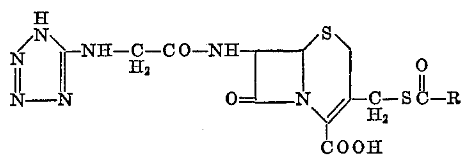

R as in 6 above.
Equivalents are Belgium 743,014 (Farmdoc 43,126R) and Netherlands 6918611.

(10) Ciba's South Africa 69/8,399 discloses compounds having the structure

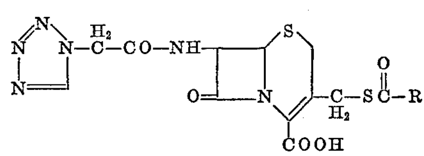

R as in 6 above.
Equivalents are Belgium 742,933 (Farmdoc 41,568R) and Netherlands 6918531

(11) Ciba's South Africa 68/8,185 discloses compounds having the structure

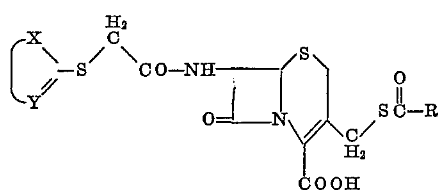

R as in 6 above.
An equivalent is Netherlands 6818868. (Farmdoc 38,504).

(12) Ciba's Netherlands 6818868 (Farmdoc 38,505) discloses compounds having the structure

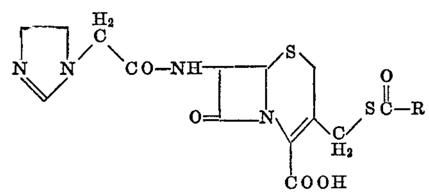

R as in 6 above.
Equivalents are South Africa 8120/68, German 1,817,-121 and Belgium 726,316

(13) Fujisawa's Great Britain 1,187,393, for example, at page 5, lines 67–71 discloses compounds having the structure

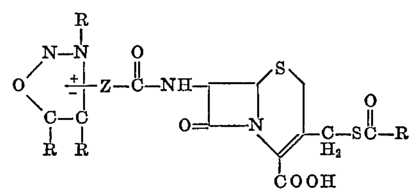

in which R represents methyl, thienyl, pyridyl, etc. and wherein general disclosure is made of other heterocyclic groups as at pages 1 and 2.

Equivalents are Netherlands 6714888 (Farmdoc 31,936) and U.S. 3,530,123.

(14) Fujisawa's Belgium 714,518 (Farmdoc 35,307) discloses (among many others) compounds having the structure

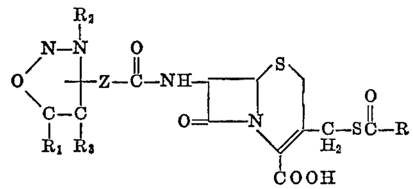

wherein R is as (13) above.
Equivalents are Netherlands 6806129 and South African 68/2,695.

(15) Glaxo's U.S. 3,243,435 and Belgium 650,444 (Farmdoc 15,535) disclose generally a vast variety of compounds having the structure

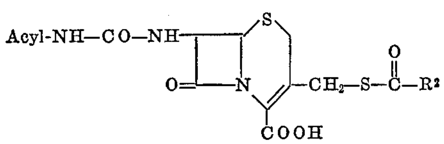

wherein $R^2$, is defined, e.g. in columns 1 and 4, to include various heterocyclic groups.

(16) Ciba's South Africa 65/6,950 (Farmdoc 22,192) discloses compounds having the structure

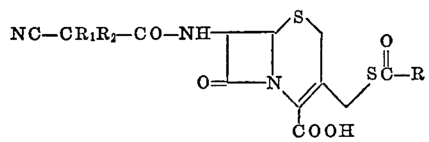

in which R in Example 20 is phenyl.

Equivalents are Great Britain 1,109,525 and Canada 807,651.

(17) Glaxo's U.S. 3,479,350 discloses a process for producing 3-pyridiniummethyl cephalosporins which utilizes as an intermediate compounds of the type described in references 2 and 3 above.

SUMMARY OF THE INVENTION

This invention comprises the compounds of the formula

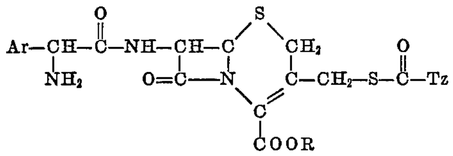

wherein Tz is 3-isothiazolyl, 4-isothiazolyl or 5-isothiazolyl; Ar is phenyl, 2-thienyl or 3-thienyl and having the D configuration in the 7-sidechain and existing primarily as the zwitterion when R is hydrogen; and R is hydrogen, pivaloyloxymethyl, acetoxymethyl, methoxymethyl, acetonyl or phenacyl; and their nontoxic, pharmaceutically acceptable salts.

Such salts include the nontoxic, carboxylic acid salts thereof when R is hydrogen, including nontoxic metallic salts such as sodium, potassium, calcium and aluminum, the ammonium salt and substituted ammonium salts, e.g. salts of such nontoxic amines as trialkylamines, including triethylamine, procaine, dibenzylamine, N-benzyl-beta-phenethylamine, 1-ephenamine, N,N'-dibenzylethylenediamine, dehydroabietylamine, N,N'-bis-dehydroabietylethylenediamine, N-(lower)-alkylpiperidine, e.g., N-ethylpiperidine, and other amines which have been used to form salts with benzylpenicillin; and in all cases the nontoxic acid addition salts thereof (i.e., the amine salts) including the mineral acid addition salts such as the hydrochloride, hydrobromide, hydroiodide, sulfate, sulfamate and phosphate and the organic acid addition salts such as the maleate, acetate, citrate, oxalate, succinate, benzoate, tartrate, fumarate, malate, mandelate, ascorbate and the like.

The compounds of the present invention are prepared according to the present invention by coupling with 7-amino-3-[S-(isothiazol-3-, 4- or 5-yl)carbonyl]-thiomethyl-3-cephem-4-carboxylic acid (II) (or a salt or easily hydrolyzed ester thereof including those of U.S. Pat. 3,284,451 and United Kingdom 1,229,453 and any of the silyl esters described in U.S. Pat. 3,249,622 for use with 7-aminopenicillanic acid and used in Great Britain 1,073,-530) a particular acid or its functional equivalent as an acylating agent for a primary amino group. After coupling, the blocking group is removed to give the desired product. Said acid has the formula

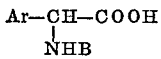

wherein Ar represent phenyl, 2-thienyl or 3-thienyl and wherein B represents a blocking group of the type used either in peptide syntheses or in any of the numerous syntheses of α-aminobenzylpenicillin from 2-phenylglycine. Particularly valuable blocking groups are a proton, as in the compound of the formula

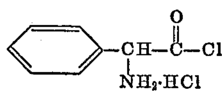

or a β-diketone as in Great Britain 1,123,333, e.g., methyl acetoacetate, in which case the acid containing the blocked amino group is preferably converted to a mixed anhydride, as with ethyl chloroformate, before reaction with compound II or a salt thereof to form the desired product I after acid cleavage.

Further to the discussion above of blocking groups used on the free amino group of the sidechain acid during its coupling with compound II, the blocking group is then removed to form the products of the present invention, e.g., the t-butoxy-carbonyl group is removed by treatment with formic acid, the carbobenzyloxy group is removed by catalytic hydrogenation, the 2-hydroxy-1-naphthcarbonyl group is removed by acid hydrolysis and the trichloroethoxycarbonyl group by treatment with zinc dust in glacial acetic acid. Obviously other functionally equivalent blocking groups for an amino group can be used and such groups are considered within the scope of this invention.

Thus, with respect to said acid to be used to couple with compound II, functional equivalents include the corresponding acid anhydrides, including mixed anhydrides, and particularly the mixed anhydrides prepared from stronger acids such as the lower aliphatic monoesters of carbonic acid, or alkyl and aryl sulfonic acids and of more hindered acids such as diphenylacetic acid. In addition, an acid azide or an active ester or thioester (e.g., with p-nitrophenol, 2,4-dinitrophenol, thiophenol, thioacetic acid) may be used or the free acid itself may be coupled with compound II after first reacting said free acid with N,N'-dimethylchloroformiminium chloride [cf. Great Britain 1,008,170 and Novak and Weichet, Experientia XXI, 6 360 (1965)] or by the use of enzymes or of an N,N'-carbonyldiimidazole or an N,N'-carbonylditriazole [cf. South African patent specification 63/2,684] or a carbodiimide reagent [especially N,N'-dicyclohexylcarbodiimide, N,N'-diisopropylcarbodiimide or N-cyclohexyl-N'-(2 - morpholinoethyl)carbodiimide; cf. Sheehan and Hess, J. Amer. Chem. So., 77, 1067 (1955)], or of alkylylamine reagent [cf. R. Buijle and H. G. Viehe, Angew. Chem. International Edition 3, 582 (1964)], or of a ketenimine reagent [cf. C. L. Stevens and M. E. Mond, J. Amer. Chem. Soc., 80 (4065)] or of an isoxazolium salt reagent [cf. R. B. Woodwar, R. A. Olofson and H. Mayer, J. Amer. Chem. Soc., 83, 1010 (1961)]. Another equivalent of the acid chloride is a corresponding azolide, i.e., an amide of the corresponding acid whose amide nitrogen is a member of an quasiaromatic five-membered ring containing at least two nitrogen atoms, i.e., imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acds yield dimidazolide. The by-product, imidazole, precipitates and may be separated and the imidazolide isolated, but this is not essential. The methods for carrying out these reactions to produce a cephalosporin and the methods used to isolate the cephalosporin so produced are well known in the art.

In the treatment of bacterial infections in man, the compounds of this invention are administered orally or parenterally, in accordance with conventional procedures for antibiotic administration, in an amount of from about 5 to 200 mg./kg./day and preferably about 5 to 20 mg./kg./day in divided dosage, e.g., three to four times a day. They are administered in dosage units containing, for example, 125 or 250 or 500 mg. of active ingredient with suitable physiologically acceptable carriers or excipients. The dosage units are in the form of liquid preparations such as solutions or suspensions or as solids in tablets or capsules.

The preferred esters of the cephalosporins of the present invention are the pivaloyloxymethyl, acetoxymethyl, methoxymethyl, acetonyl and phenacyl esters. All are useful intermediates in the production of the cephalosporin having a free carboxyl group and the first three are also of interest because on oral administration they provide different rates and amounts of absorption and give differing concentrations of the active antibacterial agent in blood and tissues.

As indicated above, these five esters of 7-aminocephalosporanic acid are each prepared by known methods. One excellent procedure is that of U.S. Pat. No. 3,284,451 in which sodium cephalothin is esterified by reaction with the corresponding active chloro or bromo compound (e.g. phenacyl bromide, chloroacetone, chloromethyl ether, pivaloyloxymethyl chloride [also called chloromethyl pivalate], acetoxymethyl chloride) and then the thienylacetic acid sidechain is removed enzymatically as in the same patent or chemically as in U.S. Pat. No. 3,575,970 and in Journal of Antibiotics, XXIV (11), 767–773 (1971). In another good method the triethylamine salt of 7-aminocephalosporanic acid is reacted directly with the active halogen compound, as in United Kingdom 1,229,453.

These esters of 7-aminocephalosporanic acid are then reacted with the nucleophile in the same manner as is illustrated herein for 7-aminocephalosporanic acid itself. The 3-triolated ester of 7-aminocephalosporanic acid is then coupled with the 2-arylglycine, e.g. D-(—)-2-phenylglycine, as before. Before or after removal of any blocking group on the α-amino group of the 2-arylglycine sidechain, the ester of the cephalosporin so obtained is, if not used per se, converted to its free acid, including its zwitterion (and, if desired, any salt) by removal of the esterifying group, as by aqueous or enzymatic hydrolysis (as with human or animal serum) or acidic or alkaline hydrolysis or by treatment with sodium thiophenoxide as taught in U.S. 3,284,451 and, in the penicillin series, by Sheehan et al., J. Org. Chem. 29(7), 2006–2008 (1964).

In another alternative synthesis, the 3-thiolated 7-aminocephalosporanic acid is prepared as described herein and then acylated at the 7-amino group and finally esterified, as by reaction of the appropriate alcohol with the acid chloride prepared, for example, by reaction of the final cephalosporin with thionyl chloride or by other essentially acidic esterification procedures.

The preferred and most active compounds of the present invention are those having the D configuration at the α-carbon atom in the 7-sidechain, that is, those made from D-(−)-2-phenylglycine, which is also called D-(−)-α-amino-phenylacetic acid, and D-(−)-2-thienylglycine and D-(−)-3-thienylglycine. In addition, the configuration at the two optically active, asymmetric centers in the β-lactam nucleus is that found in cephalosporin C produced by fermentation and in the 7-aminocephalosporanic acid derived therefrom.

Isothiazole-5-thiocarboxylic acid

A mixture of 15 g. of isothiazole-5-carboxylic acid and 75 ml. of thionyl chloride was heated under reflux for 12 hr. The excess reagent was removed under reduced pressure and the residue was distilled at 41–43°/1.5 mm. to provide 14.5 g. (.0985 mole) of the acid chloride. This was added dropwise to a stirred and cooled solution of 22.0 g. (0.2 mole) of hydrated sodium sulfhydrate in 225 ml. of ethanol and 25 ml. of water at such a rate as to keep the temperature of the mixture at 10–15°. After the addition was completed, the reaction mixture was stirred for 40 min. at 5–10°. Most of the ethanol was removed under reduced pressure and the residue was dissolved in 130 ml. of water. The pH of the solution was lowered to 2.8 by addition of 6 N hydrochloric acid and was maintained there while the mixture was extracted with 5× 100 ml. portions of ethyl acetate. The extracts were combined, washed with ice-water, dried over magnesium sulfate and evaporated to dryness to give 11.7 g. (82%) of isothiazole-5-thiocarboxylic acid as a yellow solid, M.P. 90–91° dec. An analytical sample was prepared by sublimation at 65°/0.05 mm. which provided yellow crystals of M.P. 93–94° dec.

Calcd. for $C_4H_3NOS_2$ (percent): C, 33.12; H, 2.08; N, 9.66; S, 44.12. Found (percent): C, 32.83; H, 2.01; N, 9.78; S, 44.39.

7-amino-3-(isothiazol-5-ylcarbonylthiomethyl)-3-cephem-4-carboxylic acid (a) To a stirred solution of 9.8 g. (.036 mole) of 7-aminocephalosporanic acid and 6.05 g. (.072 mole) of sodium bicarbonate in 170 ml. of aqueous phosphate (buffered at pH 6.4) was added 5.2 g. (.036 mole) of isothiazole-5-thiocarboxylic acid. The mixture was stirred under a nitrogen atmosphere and heated to 100° for 15 min., then allowed to cool to 35° over a 40 min. period. The solid which precipitated was collected by filtration, washed with water and acetone and dried in vacuo over phosphorus pentoxide. The product, 7-amino-3-(isothiazol-5-ylcarbonylthiomethyl)-3-cephem - 4 - carboxylic acid (3.75 g.) had infrared absorption maxima (KBr disc) at 1805 and 1645 cm.$^{-1}$ (β-lactam carbonyl and thiolester carbonyl).

(b) To a stirred solution of 18.0 g. (.066 mole) of 7-aminocephalosporanic acid and 11.1 g. (.132 mole) of sodium bicarbonate in 320 ml. of aqueous phosphate (buffered at pH 6.4) was added 9.6 g. (.066 mole) of isothiazole-5-thiocarboxylic acid. The mixture was stirred in a nitrogen atmosphere at 50° for 5 hr. and was then cooled to 20°. The precipitated solid was collected by filtration, washed with water and acetone and dried in vacuo over phosphorus pentoxide to provide 8.5 g. of 7-amino-3-(isothiazol-5-ylcarbonylthiomethyl)-3-cephem-4-carboxylic acid as a crystalline solid, M.P. 208–210° dec.

Calcd. for $C_{12}H_{11}N_3O_4S_3 \cdot 0.5H_2O$ (percent): C, 39.33; H, 3.30; N, 11.47; $H_2O$, 2.46. Found (percent): C, 39.49; H, 3.08; N, 11.69; $H_2O$, 1.61.

Infrared and N.M.R. spectra were consistent with the structure.

A second crop of 2.8 g. was obtained by lowering the pH of the filtrate to 6.2 with 6 N hydrochloric acid and collecting the solid as described above; total yield 11.3 g., 47%.

Pivaloxyloxymethyl 7-amino-3-(isothiazol-5-yl)-carbonylthiomethyl-3-cephem-4-carboxylate Method A.—The title compound is produced by substituting for the 7-aminocephalosporanic acid used immediately above an equimolar weight of pivaloyloxymethyl 7-aminocephalosporanate hydrochloride prepared according to Example 2 of United Kingdom 1,229,453 from 7-aminocephalosporanic acid. German 1,904,585 (Farmdoc 39,445) is equivalent to United Kingdom 1,229,453.

Method B.—The title compound is produced by substituting for the 0.025 mole (6.8 g.) 7-aminocephalosporanic acid used in the procedure of Example 2 of United Kingdom 1,229,453 an equimolar weight of 7-amino-3-(isothiazol-5-yl)carbanoylthiomethyl - 3 - cephem-4-carboxylic acid.

The respective acetoxymethyl, methoxymethyl, acetonyl and phenacyl esters of 7-amino-3-(isothiazol-5-yl) carbonylthiomethyl-3-cephem-4-carboxylic acid are prepared by substituting in Method B above for the chloromethyl pivalate used therein an equimolar weight of chloromethyl acetate, chloromethyl methyl ether, chloroacetone and phenacyl bromide, respectively.

Acetoxymethyl 7-amino-3-(isothiazol-5-yl)carbanoyl-thiomethyl-3-cephem-4-carboxylate The title compound is produced by substituting for the 7-aminocephalosporanic acid used above (in the reaction with isothiazol-5-thiocarboxylic acid) an equimolar weight of acetoxymethyl 7-aminocephalosporanate hydrochloride prepared according to Binderup et al., Journal of Antibiotics, XXIV (11), 767–773 (November 1971).

In similar fashion the respective pivaloyloxymethyl, methoxymethyl, acetonyl and phenacyl esters of 7-aminocephalosporanic acid are prepared (as hydrochlorides) by replacing the chloromethyl acetate in the procedure of Binderup et al., ibid. with equimolar weights of chloromethyl pivalate, chloromethylmethyl ether, chloroacetone and phenacyl bromide, respecitvely. Each of these hydrochloride esters of 7–ACA is then reacted as was the acetoxymethyl ester hydrochloride to produce the corresponding ester of 7-amino-3-(isothiazol-5-yl)carbonylthiomethyl-3-cephem-4-carboxylic acid.

Potassium isothiazole-3-thiocarboxylate isothiazole-3-thiocarboxylic acid

This thiocarboxylic acid is not reported in Chem. Abst. 1907–1971.

Isothiazole-3-carboxylic acid (15.0 g., 116 mmoles) suspended in dry boiling benzene (150 ml.) containing ca. 6 drops of dimethylformamide (DMF) was treated dropwise, with stirring under $N_2$, with oxalyl chloride (22.4 g., 177 mmoles) in benzene (30 ml.). After a two hour reflux period, the mixture was cooled, concentrated and distilled to give the acid chloride B.P. 58–60°/0.1 mm., 14.11 g., 83%.

The above acid chloride (14.11 g., 96 mmoles) dissolved in benzene (15 ml.) was added dropwise, under $N_2$, to a solution of KSH (15.5 g., 192 mmoles) in dry ethanol (150 ml.) stirred and maintained at 5° C. After stirring for two hours at 5°, the mixture was concentrated in vacuo (12 mm.) at 30–35° to leave a yellowish solid, 24.8 g. (95%). By spectral analysis this solid is found to consist of 23%–33% w./w. KCl and 67%–77% of the potassium salt of isothiazole-3-thiocarboxylic acid. (This mixture is used as such for the coupling reaction with 7–ACA.)

7-amino-3-(isothiazol-3-yl)carbonylthiomethyl-3-cephem-4-carboxylic acid

To a stirred slurry of 24.7 g. (.09 mole) of 7-aminocephalosporanic acid and 7.56 g. (.09 mole) of sodium bicarbonate in 500 ml. of 0.1 M aqueous phosphate (buffered at pH 6.4) was added 24.7 g. (.09 mole) of potassium isothiazole-3-thiocarboxylate (estimated purity 67% by weight, contaminant potassium chloride). The mixture was stirred under a nitrogen atmosphere for 5 hr. at 51–2°, and was then stirred for 12 hr. without external heating. The product was collected by filtration, washed with water and with acetone and then dried in vacuo over phosphorus pentoxide to yield 23.5 g. (73%) of tan, solid 7 - amino - 3-(isothiazol-3-yl)carbonylthiomethyl-3-cephem-4-carboxylic acid, M.P. 213–5° dec. Infrared and N.M.R. spectra were consistent with the structure.

Found (percent): C, 40.62; H, 3.26; N, 11.59. Calcd. for $C_{12}H_{11}N_3O_4S_3$ (percent): C, 40.32; H, 3.10; N, 11.76.

Pivaloyloxymethyl 7-amino-3-(isothiazol-3-yl)carbonylthiomethyl-3-cephem-4-carboxylate Method A.—The title compound is produced by substituting for the 7-aminocephalosporanic acid used immediately above an equimolar weight of pivaloyloxymethyl 7-aminocephalosporante hydrochloride prepared according to Example 2 of United Kingdom 1,229,453 from 7-aminocephalosporanic acid. German 1,904,585 (Farmdoc 39,445) is equivalent to United Kingdom 1,229,453.

Method B.—The title compound is produced by substituting for the 0.025 mole (6.8 g.) 7-aminocephalosporanic acid used in the procedure of Example 2 of United Kingdom 1,229,453 an equimolar weight of 7-amino-3-(isothiazol-3-yl)carbonylthiomethyl-3-cephem - 4 - carboxylic acid.

The respective acetoxymethyl, methoxymethyl, acetonyl and phenacyl esters of 7-amino-3-(isothiazol-3-yl)carbonylthiomethyl - 3 - cephem - 4 - carboxylic acid are prepared by substituting in Method B above for the chloromethyl pivalate used therein an equimolar weight of chloromethyl acetate, chloromethyl methyl ether, chloroacetone and phenacyl bromide, respectively.

Acetoxymethyl 7-amino-3-(isothiazol-3-yl)carbonylthiomethyl-3-cephem-4-carboxylate The title compound is produced by substituting for the 7-aminocephalosporanic acid used above (in the reaction with isothiazol-3-thiocarboxylic acid) an equimolar weight of acetoxymethyl 7-aminocephalosporanate hydrochloride prepared according to Binderup et al., Journal of Antibiotics, XXIV (11), 767–773 (November 1971).

In similar fashion the respective pivaloyloxymethyl, methoxymethyl, acetonyl and phenacyl esters of 7-aminocephalosporanic acid are prepared (as hydrochlorides) by replacing the chloromethyl acetate in the procedure of Binderup et al., ibid., with equimolar weights of chloromethyl pivalate, chloromethyl methyl ether, chloroacetone and phenacyl bromide, respectively. Each of these hydrochloride esters of 7–ACA is then reacted as was the acetoxy-methyl ester hydrochloride to produce the corresponding ester of 7 - amino-3-(isothiazol-3-yl)carbonylthiomethyl-3-cephem-4-carboxylic acid.

Potassium isothiazole-4-carboxylate isothiazole-4-thiocarboxylic acid

This thiocarboxylic acid is not reported in Chem. Abst. 1907–1971.

The procedure for its preparation is identical to the one reported above for the 3-isomer.

Acid chloride: yield 88%, B.P. 60–62°/0.2 mm.

Potassium salt of isothiazole - 4-thiocarboxylic acid: yield 95%, containing 23%–33% w./w. KCl.

[The synthesis and properties of isothiazole-3-, 4- and 5-carboxylic acid are described, inter alia, in U.S. Pat. 3,271,407 and other publications cited therein.]

7-amino-3-(isothiazol-4-yl)carbonylthiomethyl-3-cephem-4-carboxylic acid

To a stirred slurry of 42.5 g. (.156 mole) of 7-aminocephalosporanic acid and 13.1 g. (.156 mole) of sodium bicarbonate in 800 ml. of 0.1 M aqueous phosphate (buffered at pH 6.4) was added 42.6 g. (.156 mole) of potassium isothiazole-4-thiocarboxylate (estimated purity 67% by weight, contaminant potassium chloride). The mixture was stirred under a nitrogen atmosphere at 55° for 4 hr. and the pH was then adjusted to 6.0 by addition of 3 N hydrochloric acid. The product was collected by filtration, washed with water, acetone and ether and dried in vacuo over phosphorus pentoxide to provide 34.5 g. (62%) of amorphous, solid 7-amino-3-(isothiazol-4-yl) carbonylthiomethyl-3-cephem-4-carboxylic acid, M.P. 210° dec. Infrared and N.M.R. spectra were consistent with the structure.

Found (percent): C, 40.38; H, 3.28; N, 11.72. Calcd. for $C_{12}H_{11}N_3O_4S_3$ (percent): C, 40.32; H, 3.10; N, 11.76.

Pivaloyloxymethyl 7-amino-3-(isothiazolyl-4-yl) carbonylthiomethyl-3-cephem-4-carboxylate Method A.—The title compound is produced by substituting for the 7-aminocephalosporanic acid used immediately above an equimolar weight of pivaloyloxymethyl 7 - aminocephalosporanate hydrochloride prepared according to Example 2 of U.K. 1,229,453 from 7-aminocephalosporanic acid. German 1,904,585 (Farmdoc 39,445) is equivalent to U.K. 1,229,453.

Method B.—The title compound is produced by substituting for the 0.025 mole (6.8 g.) 7-aminocephalosporanic acid used in the procedure of Example 2 of U.K. 1,229,453 an equimolar weight of 7-amino-3-(isothiazol-4-yl)carbonylthiomethyl-3-cephem-4-carboxylic acid.

The respective acetoxymethyl, methoxymethyl, acetonyl and phenacyl esters of 7-amino-3-(isothiazol-4-yl)carbonylthiomethyl-3-cephem-4-carboxylic acid are prepared by substituting in Method B above for the chloromethyl pivalate used therein an equimolar weight of chloromethyl acetate, chloromethyl methyl ether, chloroacetone and phenacyl bromide, respectively.

Acetoxymethyl 7-amino-3-(isothiazol-4-yl)carbonylthiomethyl-3-cephem-4-carboxylate The title compound is produced by substituting for the 7-aminocephalosporanic acid used above (in the reaction with isothiazol - 4 - thiocarboxylic acid) an equimolar weight of acetoxymethyl 7-aminocephalosporanate hydrochloride prepared according to Binderup et al., Journal of Antibiotics, XXIV (11), 767–773 (November 1971).

In similar fashion the respective pivaloyloxymethyl, methoxymethyl, acetonyl and phenacyl esters of 7-aminocephalosporanic acid are prepared (as hydrochlorides) by replacing the chloromethyl acetate in the procedure of Binderup et al., ibid., with equimolar weights of chloromethyl pivalate, chloromethyl methyl ether, chloroacetone and phenacyl bromide, respectively. Each of these hydrochloride esters of 7–ACA is then reacted as was the acetoxymethyl ester hydrochloride to produce the corresponding ester of 7-amino-3-(isothiazol-4-yl)carbonylthiomethyl-3-cephem-4-carboxylic acid.

The following examples are given in illustration of, but not in limitation of, the present invention. All temperatures are given in degrees centigrade. 7-aminocephalosporanic acid is abbreviated as 7–ACA and methyl isobutyl ketone as MIBK. "Skellysolve B" is petroleum ether fraction of B.P. 60–68° C. consisting essentially of n-hexane.

DESCRIPTION OF THE PREFERRED EMBODIMENTS

EXAMPLE 1

7-[D-α-aminophenylacetamido]-3-(isothiazol-5-ylcarbonylthiomethyl)-3-cephem-4-carboxylic acid To a stirred slurry of 3.66 g. (.01 mole) of 7-amino-3-(isothiazol - 5-ylcarbonylthiomethyl)-3-cephem-4-carboxylic acid hemihydrate in 100 ml. of dry methylene chloride were added successively 2.02 g. (.02 mole) of triethylamine, 1.21 g. (.01 mole) of N,N-dimethylaniline and 3.27 g. (.03 mole) of trimethylchlorosilane. The mixture was heated under reflux for 0.5 hr., 2 ml. of N,N-dimethylformamide was added and heating was continued for 0.25 hr. The solution was cooled to 3° and to it was added with vigorous stirring 2.27 g. (0.11 mole) of D(—)-2-phenylglycyl chloride hydrochloride. The resulting slurry was stirred for 1 hr. at 3–5° and for 1 hr. without external cooling. Ice-water (50 ml.) was added to the stirred reaction mixture and the precipitated product was collected by filtration, washed with water and acetone and dried in vacuo over phosphorus pentoxide to provide 3.55 g. of tan solid. A purer sample of the product was obtained from the aqueous portion of the filtrate. This was layered with ether and treated with 2 N sodium hydroxide to adjust the pH to 5.0. The solid which precipitated was collected by filtration, washed with ether, water and acetone in succession, then dried in vacuo over phosphorus pentoxide. The white solid was slurried with 100 ml. of dry ether for 0.25 hr. (to remove dimethylaniline), collected by filtration and dried in vacuo to yield 367 mg. 7-[D-α-aminophenylacetamido]-3-(isothiazol - 5-ycarbonylthiomethyl)-3-cephem-4-carboxylic acid. Infrared absorption maxima (KBr disc) occurred at 1780 cm.$^{-1}$ (β-latcam carbonyl), 1700 cm.$^{-1}$ (amide carbonyl), 1650 cm.$^{-1}$ (thiolester carbonyl), 1610 and 1400 cm.$^{-1}$ (carboxylate).

EXAMPLE 2

To a stirred slurry of 5.49 g. (.015 mole) of 7-amino-3-(isothiazol-5-ylcarbonylthiomethyl) - 3 - cephem-4-carboxylic acid hemihydrate in 150 ml. of dry methylene chloride were added in succession 2.73 g. (.027 mole) of triethylamine, 3.99 g. (.033 mole) of N,N-dimethylaniline and 4.91 g. (.045 mole) of trimethylchlorosilane. The solution was heated under reflux for 0.5 hr. and was then cooled to 4° and treated with 3.40 g. (.0165 mole) of D(—)-2-phenylglycyl chloride hydrochloride. The slurry was stirred for 1 hr. at 4–6° and for 0.75 hr. without external cooling. Cold water (80 ml.) was added with stirring and the emulsion which formed was added to an excess of ethyl acetate. A solid was removed by filtration and the aqueous phase was separated from the filtrate and layered with fresh ethyl acetate. The pH was adjusted to 4.0 with 2 N sodium hydroxide and the product which precipitated was collected by filtration, washed with water and ethyl acetate and dried in vacuo over phosphorus pentoxide to yield 3.8 g. (52%) 7-[D-α-aminophenylacetamido]-3 - (isothiazol-5-ylcarbonylthiomethyl)-3-cephem-4-carboxylic acid, M.P. 168–170° dec. Infrared spectrum (KBr disc) had absorption maxima (cm.$^{-1}$) at 1780 (β-lactam carbonyl), 1690 (amide carbonyl), 1645 (thiolester carbonyl), 1605 and 1395 (carboxylate), and 710 (phenyl). The N.M.R. spectrum of a solution of the cephalosporin derivative in $d_6$-dimethylsulfoxide, deuterium oxide (1:2) and deuterium chloride (trace) showed absorptions [p.p.m. (δ) from tetramethylsilane] which were assigned as follows: doublets at 8.61 (1H), and 7.82 (1H) for the isothiazole ring protons, singlet (5H) at 7.50 due to the benzene ring protons, doublets at 5.76 (1H) and 5.08 (1H) due to the β-lactam ring protons, singlet (1H) at 5.30 for the benzylic proton, AB pattern (2H) centered at 4.18 due to the exocyclic methylene protons, AB pattern (2H) centered at 3.50 due to the protons at $C_2$ of the dihydrothiazine ring.

Found (percent): C, 47.43; H, 4.21; N, 11.33. Calcd. for $C_{20}H_{18}N_4O_5S_3 \cdot H_2O$ (percent): C, 47.23; H, 3.96; N, 11.02.

This sample of 7-[D-α-aminophenylacetamido]-3-(isothiazol-5-yl-carbonylthiomethyl)-3-cephem - 4 - carboxylic acid (called New Compound) after solution in DMSO (dimethyl sulfoxide) at 14 mgm./ml. followed by dilution with Nutrient Broth was found to exhibit the following Minimum Inhibitory Concentrations (M.I.C.) in mcg./ml. versus the indicated microorganisms as determined by overnight incubation at 37° C. by Tube Dilution. Two old, orally absorbed cephalosporins were included.

TABLE 1

| Organism | | M.I.C. in mcg./ml. | | |
|---|---|---|---|---|
| | | New cpd. | Cephalexin | Cephaloglycin |
| *D. pneumoniae* plus 5% serum [1] | A9585 | .16<br>.16 | .16<br>.16 | .06<br>.03 |
| *Str. pyogenes* plus 5% serum [1] | A9604 | .16<br>.16 | .16<br>.16 | .06<br>.03 |
| *S. aureus* Smith [2] | A9537 | .3<br>.3 | .6<br>.6 | .6<br>.6 |
| *S. aureus* Smith [2] plus 50% serum | A9537 | 32<br>63 | .6<br>2.5 | 1.3<br>1.3 |
| *S. aureus* BX1633-2 at $10^{-3}$ dilution | A9606 | .6<br>.6 | 2<br>4 | 1.3<br>.6 |
| *S. aureus* BX1633-2 at $10^{-2}$ dilution | A9606 | 4<br>4 | 4<br>4 | 1.3<br>1.3 |
| *S. aureus* meth.-resist; at $10^{-3}$ dilution | A15097 | 4<br>4 | 16<br>32 | 4<br>4 |
| *S. aureus* at $10^{-3}$ dilution | A9748 | 4<br>4 | 32<br>32 | 4<br>4 |
| *S. aureus* at $10^{-2}$ dilution | A9748 | 16<br>32 | 32<br>63 | 8<br>16 |
| *Sal. enteritidis* [2] | A9531 | <.25<br>.3 | 2<br>4 | .3<br>.3 |
| *E. coli Juhl* [2] | A15119 | 8<br>8 | 4<br>8 | 1<br>1 |
| *E. coli* [2] | A9675 | 16<br>16 | 16<br>32 | 4<br>4 |
| *K. pneumoniae* [2] | A9977 | 4<br>4 | 4<br>8 | .6<br>.6 |
| *K. pneumoniae* [2] | A15130 | 16<br>16 | 8<br>16 | 2<br>2 |
| *Pr. mirabilis* [2] | A9900 | 8<br>4 | 4<br>8 | .6<br>.6 |
| *Pr. morganii* [2] | A15153 | 16<br>32 | >125<br>>125 | 125<br>63 |
| *Ps. aeruginosa* [2] | A9843 | >125<br>>125 | >125<br>>125 | >125<br>>125 |
| *Ser. marcescens* [2] | A20019 | >125<br>>125 | >125<br>>125 | >125<br>>125 |

[1] 50% nutrient broth—45% antibiotic assay broth.
[2] At $10^{-4}$ dilution.

Blood levels in the mouse after oral administration were determined with the following results:

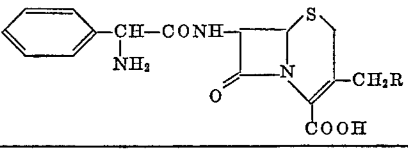

| R | Dose, mgm./kg. | Blood level in mcg./ml. 0.5 hr.[1] | 1 hr.[1] | 2 hrs.[1] | 3.5 hrs.[1] |
|---|---|---|---|---|---|
| 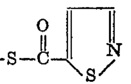 | 100<br>100<br>100 | 25.3<br>19.6<br>23.1 | 17.0<br>9.9<br>14.8 | <5.6<br>3.4<br>5.9 | <5.6<br><2.4<br><2.4 |
| —H (cephalexin)-monohydrate | 100<br>100<br>100 | 28.9<br>27.6<br>27.6 | 23.2<br>13.5<br>13.5 | 8.9<br>5.1<br>5.1 | 4.1<br>1.5<br>1.5 |

[1] After administration.

EXAMPLE 3

Sodium 7 - [D-(α-amino-α-phenylacetamido)]-3-[S-(isothiazol-5-yl)-carbonyl]thiomethyl - 3 - cephem-4-carboxylate To a stirred aqueous suspension of the zwitterionic form of 7 - [D-(α-amino-α-phenylacetamido)]-3-[S-(isothiazol-5-yl)carbonyl]thiomethyl-3 - cephem-4-carboxylic acid (0.8 mmole) is added 1 N aqueous sodium hydroxide at room temperature until a clear solution (pH 10.8) is obtained. This solution is immediately freeze-dried to give impure, solid sodium 7 - [D-(α-amino-α-phenylacetamido)] - 3 - [S-(isothiazol - 5 - yl)carbonyl]thiomethyl-3-cephem-4-carboxylate.

EXAMPLE 4

7-[D-α-amino-α-(3-thienyl)-acetamido]-3-[S-(isothiazol-5-yl)-carbonyl]thiomethyl-3-cephem-4-carboxylic acid This compound is prepared by substituting an equimolar weight of D-(—)-α-amino-α-(3-thienyl)-acetyl chloride hydrochloride in the procedure of Example 2 for the D-(—)-α-amino-α-phenylacetyl chloride hydrochloride used therein.

EXAMPLE 5

7-[D-α-amino-α-(2-thienyl)-acetamido]-3-[S-(isothiazol-5-yl)-carbonyl]thiomethyl-3-cephem-4-carboxylic acid Following the exact same procedure as in Example 2 except using an equimolar weight of D-(—)-α-amino-α-(2-thienyl)-acetylchloride hydrochloride in place of the D-(—)-2-phenylglycylchloride hydrochloride used therein gives this compound.

EXAMPLE 6

Acetoxymethyl 7 - [D - α - aminophenylacetamido] - 3-[S - (isothiazol - 5 - yl)carbonyl]thiomethyl - 3-cephem - 4 - carboxylate To a solution of acetoxymethyl 7-amino-3-[S-isothiazol-5-yl)carbonyl]thiomethyl-3-cephem-4-carboxylate (regenerated from 0.009 mole of its hydrochloride) in 30 ml. ethyl acetate is added 0.020 mole pyridine. The mixture is cooled in ice and stirred while 0.010 mole D-(—)-2-phenylglycine chloride hydrochloride in 30 ml. ethyl acetate is added over ten minutes. After a further twenty minutes in the cold, stirring is continued at room temperature for one hour. Then the mixture is washed successively with aqueous sodium bicarbonate, 0.1 N hydrochloric acid and water, dried and evaporated in vacuo to leave the desired acetoxymethyl 7-[D-α-aminophenylacetamido]-3-[S-(isothiazol - 5 - yl)carbonyl]thiomethyl-3-cephem-4-carboxylate as an oil which crystallizes on trituration in cyclohexane.

The respective pivaloyloxymethyl, methoxymethyl, acetonyl and phenacyl esters corresponding to the above acetoxymethyl ester are produced by replacing the acetoxymethyl 7-amino-3-[S-(isothiazol - 5 - yl)carbonyl]thiomethyl-3-cephem-4-carboxylate hydrochloride used in the above procedure with 0.009 mole of the hydrochloride of pivaloyloxymethyl, methoxymethyl, acetonyl and phenacyl esters of 7-amino-3-[S-isothiazol - 5 - yl)carbonyl]thiomethyl-3-cephem-4-carboxylic acid, respectively.

EXAMPLE 7

7-[D-(—)-α-aminophenylacetamido]-3-(isothiazol-3-yl) carbonylthiomethyl-3-cephem-4-carboxylic acid To a stirred slurry of 17.9 g. (0.5 mole) of 7-amino-3-(isothiazol-3-yl)carbonylthiomethyl - 3 - cephem - 4-carboxylic acid in 400 ml. of dry methylene chloride were added successively 9.1 g. (.09 mole) of triethylamine, 13.3 g. (.11 mole) of N,N-dimethylaniline and 16.35 g. (.15 mole) of trimethylchlorosilane. The mixture was heated under reflux for 30 min. and the clear solution which formed was cooled to 5°. D-(—)-2-phenylglycyl chloride hydrochloride (11.3 g., .055 mole) was added and the slurry was stirred for 45 min. at 5–7° and for 45 min. without external cooling. The solution was added to 200 ml. of water with stirring and the solid which precipitated was removed by filtration. The aqueous phase of the filtrate was diluted with 50 ml. of methanol and the pH was adjusted to 4.0 by addition of 2 N sodium hydroxide. The slurry was cooled to 5° and the product was collected by filtration, washed with water, acetone and ether and then dried in vacuo over phosphorus pentoxide to provide 2.26 g. (9%) of amorphous, solid, 7-[D-(—)-α-aminophenylacetamido] - 3 - (isothiazol - 3 - yl)carbonylthiomethyl-3-cephem-4-carboxylic acid M.P. 172–4° dec. Infrared spectrum (KBr disc) showed absorption maxima (cm.$^{-1}$) at 1775 (β-lactam carbonyl); 1675 (amide carbonyl); 1650 (thioester carbonyl); 1605, 1390 (carboxylate); 700 (phenyl). The N.M.R. spectra of a solution of the product in $d_6$-dimethylsulfoxide-deuterium oxide (1:2) with a trace of deuterium chloride showed absorptions [p.p.m. (δ) from tetramethylsilane] which were assigned as follows: doublet (1H) at 9.05 and doublet (1H) at 7.75 for the isothiazole ring protons; singlet (5H) at 7.51 due to the benzene ring protons; doublet (1H) at 5.74 and doublet (1H) at 5.07 for the β-lactam protons; singlet (1H) at 5.21 due to the benzylic proton; AB quartet (2H) centered at 4.11 due to the exocyclic methylene protons; AB quartet (2H) centered at 3.48 due to the protons at $C_2$ of the dihydrothiazine ring. Found (percent): C, 47.27; H, 3.89; N, 10.73; $H_2O$, 3.40. Calcd. for $C_{20}H_{18}N_4O_5S_3 \cdot H_2O$ (percent): C, 47.23; H, 3.96; N, 11.02; $H_2O$, 3.54.

EXAMPLE 8

7-[D-α-amino-α-(3-thienyl)-acetamido]-3-[S-(isothiazol-3-yl)carbonyl]thiomethyl-3-cephem-4-carboxylic acid This compound is prepared by substituting an equimolar weight of D-(—)-α-amino-α-(3-thienyl)-acetyl chloride hydrochloride in the procedure of Example 7 for the D-(—)-α-amino - α - phenylacetyl chloride hydrochloride used therein.

EXAMPLE 9

7-[D-α-amino-α-(2-thienyl)-acetamido]-3-[S-(isothiazol-3-yl)carbonyl]thiomethyl-3-cephem-4-carboxylic acid Following the exact same procedure as in Example 7 except using an equimolar weight of D-(—)-α-amino-α-(2-thienyl)-acetylchloride hydrochloride in place of the D-(—)-2-phenylglycyl chloride hydrochloride used therein gives this compound.

EXAMPLE 10

Acetoxymethyl 7 - [D - α - aminophenylacetamido]-3-[S-(isothiazol - 3 - yl)carbonyl]thiomethyl - 3 - cephem-4-carboxylate To a solution of acetoxymethyl 7 - amino - 3 - [S-(isothiazol - 3 - yl)carbonyl]thiomethyl - 3 - cephem-4-carboxylate (regenerated from 0.009 mole of its hydrochloride) in 30 ml. ethyl acetate is added 0.020 mole pyridine. The mixture is cooled in ice and stirred while 0.010 mole D - (—) - 2 - phenylglycine chloride hydrochloride in 30 ml. ethyl acetate is added over ten minutes. After a further twenty minutes in the cold, stirring is continued at room temperature for one hour. Then the mixture is washed successively with aqueous sodium bicarbonate, 0.1 N hydrochloric acid and water, dried and evaporated in vacuo to leave the desired acetoxymethyl 7 - [D - α - aminophenylacetamido] - 3 - [S - (isothiazol-3 - yl)carbonyl]thiomethyl - 3 - cephem - 4 - carboxylate as an oil which crystallizes on trituration in cyclohexane.

The respective pivaloyloxymethyl, methoxymethyl acetonyl and phenacyl esters corresponding to the above acetoxymethyl ester are produced by replacing the acetoxymethyl 7-amino-3-[S-(isothiazol-3-yl)carbonyl]-thiomethyl-3-cephem-4-carboxylate hydrochloride used in the above procedure with 0.009 mole of the hydrochloride of pivaloyloxymethyl, methoxymethyl, acetonyl and phenacyl esters of 7-amino-3-[S-(isothiazol - 3 - yl)carbonyl]thiomethyl-3-cephm-4-carboxylic acid, respectively.

EXAMPLE 11

7-[D-(−)-α-aminophenylacetamido]-3-(isothiazol-4-yl) carbonylthiomethyl-3-cephem-4-carboxylic acid To a stirred slurry of 17.8 g. (.05 mole) of 7-amino-3-(isothiazol-4-yl)carbonylthiomethyl-3-cephem - 4 - carboxylic acid in 150 ml. of dry methylene chloride were added 14.0 ml. (.1 mole) of triethylamine and 7.5 ml. (.059 mole) of N,N-dimethylaniline. The mixture was cooled to 5° and 12.7 ml. (.1 mole) of trimethylchlorosilane was added dropwise over 10 min. The mixture was heated under reflux for 30 min. and then cooled to 5° and treated successively with 10 ml. of a 30% solution of N,N-dimethylaniline hydrochloride in methylene chloride and with 10.9 g. (.053 mole) of D-(−)-2-phenylglycyl chloride hydrochloride. The slurry was stirred for 2.5 hr. at 10°, 150 ml. of water was added and after stirring for 10 min. the pH was adjusted to 2.0 with 20% aqueous sodium hydroxide. The solid material was collected by filtration, washed with water and air-dried. It was suspended in 400 ml. of 50% aqueous methanol and the pH was adjusted to 1.5 with 3 N hydrochloric acid. The mixture was stirred 10 min. in the presence of 5 g. of "Darco KB" activated charcoal and then filtered through diatomaceous earth. To the filtrate was added with stirring 20% aqueous sodium hydroxide until the pH was 4.0. The product which precipitated was collected by filtration, washed with water, acetone and ether and air-dried to provide 15 g. (61%) of amorphous, solid 7-[D-(−)-α-aminophenylacetamido] - 3 - (isothiazol-4-yl)carbonylthiomethyl-3-cephem-4-carboxylic acid, M.P. 169° dec. Infrared spectrum (KBr disc) had absorption maxima ($cm.^{-1}$) at 1770 (β-lactam carbonyl); 1690 (amide carbonyl); 1645 (thiolester carbonyl); 1610 (carboxylate). The N.M.R. spectrum of a solution of the product in $d_6$-dimethylsulfoxide-deuterium oxide (1:2) and a trace of deuterium chloride showed absorptions (p.p.m. (δ) from tetramethylsilane] which were assigned as follows: singlet (1H) at 9.55 and singlet (1H) at 8.81 due to the isothiazole ring protons; singlet (5H) at 7.50 for the benzene ring protons; doublet (1H) at 5.73 and doublet (1H) at 5.10 due to the β-lactam protons; singlet (1H) at 5.31 for the benzylic proton; AB quartet (2H) centered at 4.13 due to the exocyclic methylene protons; AB quartet (2H) centered at 3.49 due to the protons at $C_2$ of the dihydrothiazine ring. Found (percent): C, 46.10; H, 3.99; N, 10.69; $H_2O$, 5.37. Calcd. for $C_{20}H_{18}N_4O_5S_3 \cdot 1.5\ H_2O$ (percent): C, 46.41; H, 4.09; N, 10.82; $H_2O$, 5.22.

EXAMPLE 12

7-[D-α-amino-α-(thienyl)-acetamido]-3-[S-(isothiazol-4-yl)carbonyl]thiomethyl-3-cephem-4-carboxylic acid This compound is prepared by substituting an equimolar weight of D-(—)-α-amino-α-(3-thienyl)-acetyl chloride hydrochloride in the procedure of Example 11 for the D-(—)-α-amino-α-phenylacetyl chloride hydrochloride used therein.

EXAMPLE 13

7-[D-α-amino-α-(2-thienyl)-acetamidol]-3-[S-(isothiazol-4-yl)carbonyl]thiomethyl-3-cephem-4-carboxylic acid Following the exact same procedure as in Example 11 except using an equimolar weight of D-(—)-α-amino-α-(2-thienyl)-acetylchloride hydrochloride in place of the D-(−)-2-phenylglycyl chloride hydrochloride used therein gives this compound.

EXAMPLE 14

Acetoxymethyl 7-[D-α-aminophenylacetamido]-3-[S-(isothiazol-4-yl)carbonyl]-thiomethyl - 3 - cephem-4-carboxylate To a solution of acetoxymethyl 7-amino-3-[S-(isothiazol-4-yl)carbonyl]thiomethyl-3-cephem-4-carboxylate (regenerated from 0.009 mole of its hydrochloride) in 30 ml. ethyl acetate is added 0.020 mole pyridine. The mixture is cooled in ice and stirred while 0.010 mole D-(−)-2-phenylglycine chloride hydrochloride in 30 ml. ethyl acetate is added over ten minutes. After a further twenty minutes in the cold, stirring is continued at room temperature for one hour. Then the mixture is washed successively with aqueous sodium bicarbonate, 0.1 N hydrochloric acid and water, dried and evaporated in vacuo to leave the desired acetoxymethyl 7-[D-α-aminophenylacetamido] - 3 - [S - (isothiazol-4-yl)carbonyl]thiomethyl-3-cephem-4-carboxylate as an oil which crystallizes on trituration in cyclohexane.

The respective pivaloyloxymethyl, methoxymethyl, acetonyl and phenacyl esters corresponding to the above acetoxymethyl ester are produced by replacing the acetoxymethyl 7-amino-3-[S-(isothiazol - 4 - yl)carbonyl]thiomethyl-3-cephem-4-carboxylate hydrochloride used in the above procedure with 0.009 mole of the hydrochloride of pivaloyloxymethyl, methoxymethyl, acetonyl and phenacyl esters of 7-amino-3-[S-(isothiazol - 4 - yl)carbonyl]thiomethyl-3-cephem-4-carboxylic acid, respectively.

The above—prepared samples of the products of Examples 7 and 11 (called New Compound—Ex. 7 and New Compound—Ex. 11 respectively) after solution in DMSO (dimethyl sulfoxide) at 14 mgm./ml. followed by dilution with Nutrient Broth were found as given below in Table 2 to exhibit the following Minimum Inhibitory Concentrations (M.I.C.) in mcg./ml. versus the indicated microorganisms as determined by overnight incubation at 37° C. by Tube Dilution. Two old, orally absorbed cephalosporins were tested at the same time.

TABLE 2

[M.I.C. in mcg./ml.]

| Organism | | New Compound | | | |
|---|---|---|---|---|---|
| | | Example 7 | Example 11 | Cephalexin | Cephaloglycin |
| *D. pneumoniae* plus 5% serum [a] | A9585 | .02 | .02 | 0.16 | .02 |
| Str. Pyogenes plus 5% serum [a] | A9604 | .02 | .04 | 0.16 | .02 |
| *S. aureus* Smith [b] | A9537 | 0.3 | .08 | 0.6 | 0.3 |
| *S. aureus* Smith [b] plus 50% serum | A9537 | 32 | 32 | {2.5, 1.3} | 1.3 |
| *S. aureus* BX1633-2 at $10^{-3}$ dilution | A9606 | 0.3 | 0.3 | 2 | 0.6 |
| *S. aureus* BX1633-2 at $10^{-2}$ dilution | A9606 | 4 | 2 | 4 | 0.6 |
| *S. aureus* meth.-resist; at $10^{-3}$ dilution | A15097 | 4 | 2 | 32 | 4 |
| *S. aureus* at $10^{-3}$ dilution | A9748 | 4 | 2 | 32 | 4 |
| *S. aureus* at $10^{-2}$ dilution | A9748 | 8 | 8 | 63 | 4 |
| *Sal. enteritidis* [b] | A9531 | .04 | .08 | 2 | 0.3 |
| *E. coli* Juhl [b] | A15119 | 2 | 8 | 8 | 0.5 |
| *E. coli* [b] | A9675 | 4 | 16 | 16 | 4 |
| *K. pneumoniae* [b] | A9977 | 2 | 8 | {8, 4} | 0.3 |
| *K. pneumoniae* [b] | A15130 | 16 | 16 | 16 | 1 |
| *Pr. mirabilis* [b] | A9900 | 2 | 8 | 8 | 0.3 |
| *Pr. morganii* [b] | A15153 | 63 | 63 | >125 | 63 |
| *Ps. aeruginosa* [b] | A9843A | >125 | >125 | >125 | >125 |
| *Ser. marcescens* [b] | A20019 | 125 | >125 | >125 | >125 |

[a] 50% nutrient broth, 45% antibiotic assay broth.
[b] At $10^{-4}$ dilution.

Blood levels in the mouse after oral administration were determined with the following results:

RUN 1

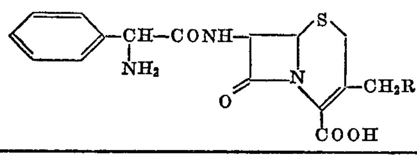

| R | Dose, mgm./kg. | Blood level in mcg./ml. 0.5 hr.[1] | 1 hr.[1] | 2 hrs.[1] | 3.5 hrs.[1] |
|---|---|---|---|---|---|
| —S—C(=O)— Ex. 7 | 100 | 17.6 | 21.3 | 8.8 | <1.5 |
| —S—C(=O)— Ex. 11 | 100 | 9.0 | 16.0 | 10.6 | <2.0 |
| —H (cephalexin)-monohydrate | 100 | 36.1 | 27.1 | 6.2 | 0.47 |

[1] After administration.

RUN 2

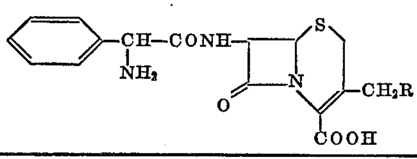

| R | Dose, mgm./kg. | Blood level in mcg./ml. 0.5 hr.[1] | 1 hr.[1] | 2 hrs.[1] | 3.5 hrs.[1] |
|---|---|---|---|---|---|
| —S—C(=O)— Ex. 7 | 100 | 20.8 | 18.5 | 7.2 | <2.0 |
| —S—C(=O)— Ex. 11 | 100 | 6.1 | 10.5 | 6.0 | 2.3 |
| —H (cephalexin)-monohydrate | 100 | 54.2 | 24.6 | 6.7 | 0.6 |

[1] After administration.

RUN 3

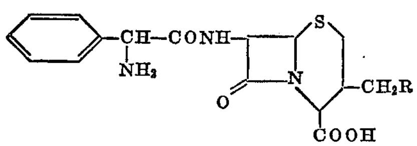

| R | Dose, mgm./kg. | Blood level in mcg./ml. 0.5 hr.[1] | 1 hr.[1] | 2 hrs.[1] | 3.5 hrs.[1] |
|---|---|---|---|---|---|
| —S—C(=O)— Ex. 7 | 100 | 16.8 | 14.0 | 4.8 | <0.9 |
| —H (cephalexin)-monohydrate | 100 | 47.5 | 19.3 | 5.4 | 1.4 |

[1] After administration.

We claim:

1. A compound having the D configuration in the 7-sidechain and the formula

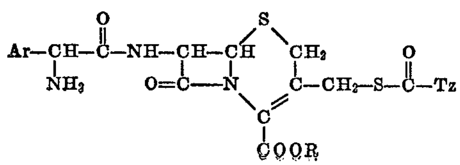

wherein Tz is 3-isothiazolyl, 4-isothiazolyl or 5-isothiazolyl; Ar is phenyl, 2-thienyl or 3-thienyl and R is hydrogen, pivaloyloxymethyl, acetoxymethyl, methoxymethyl, acetonyl or phenacyl; or a nontoxic, pharmaceutically acceptable salt thereof.

2. An acid having the D configuration in the 7-sidechain and the formula

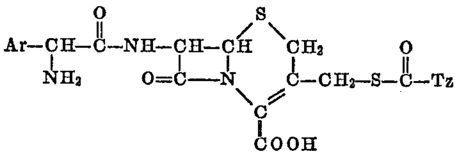

wherein Tz is 3-isothiazolyl, 4-isothiazolyl or 5-isothiazolyl and Ar is phenyl, 2-thienyl or 3-thienyl.

3. The sodium salt of a compound of claim 2.

4. The potassium salt of a compound of claim 2.

5. The zwitterion form of a compound of claim 2.

6. A nontoxic, pharmaceutically acceptable acid addition salt of a compound of claim 2.

7. The pivaloyloxymethyl ester of an acid of claim 2.

8. The acetoxymethyl ester of an acid of claim 2.

9. The methoxymethyl ester of an acid of claim 2.

10. The acetonyl ester of an acid of claim 2.

11. The phenacyl ester of an acid of claim 2.

12. A compound of claim 1 having the D configuration in the 7-sidechain and the formula

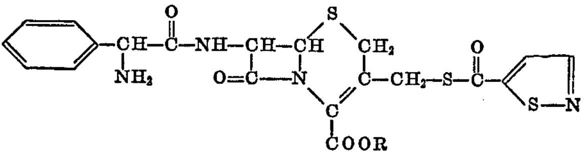

wherein R is hydrogen, pivaloyloxymethyl, acetoxymethyl, methoxymethyl, acetonyl or phenacyl; or a nontoxic, pharmaceutically acceptable salt thereof.

13. The acid having the D configuration in the 7-sidechain and the formula

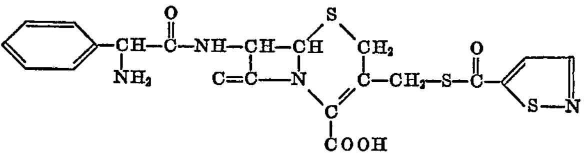

14. The sodium salt of the compound of claim 13.

15. The potassium salt of the compound of claim 13.

16. The zwitterion form of the compound of claim 13.

17. A nontoxic, pharmaceutically aceptable acid addition salt of the compound of claim 13.

18. The pivaloyloxymethyl ester of the acid of claim 13.

19. The acetoxymethyl ester of the acid of claim 13.

20. The methoxymethyl ester of the acid of claim 13.

21. The acetonyl ester of the acid of claim 13.

22. The phenacyl ester of the acid of claim 13.

23. A compound of claim 1 having the D configuration in the 7-sidechain and the formula

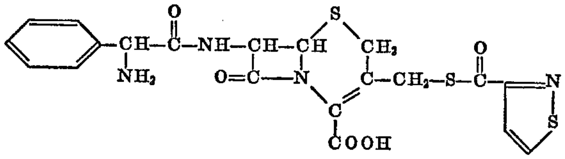

wherein R is hydrogen, pivaloyloxymethyl, acetoxymethyl, methoxymethyl, acetonyl or phenacyl; or a nontoxic, pharmaceutically acceptable salt thereof.

24. The acid having the D configuration in the 7-sidechain and the formula

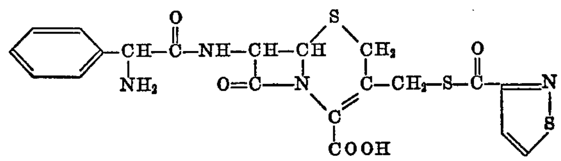

25. The sodium salt of the compound of claim 24.
26. The potassium salt of the compound of claim 24.
27. The zwitterion form of the compound of claim 24.
28. A nontoxic, pharmaceutically acceptable acid addition salt of the compound of claim 24.
29. The pivaloyloxymethyl ester of the acid of claim 24.
30. The acetoxymethyl ester of the acid of claim 24.
31. The methoxymethyl ester of the acid of claim 24.
32. The acetonyl ester of the acid of claim 24.
33. The phenacyl ester of the acid of claim 24.
34. A compound of claim 1 having the D configuration in the 7-sidechain and the formula

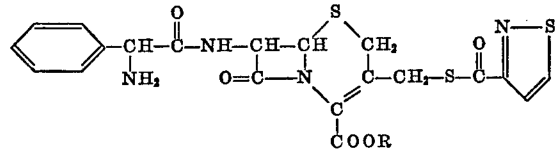

wherein R is hydrogen, pivaloyloxymethyl, acetoxymethyl, methoxymethyl, acetonyl or phenacyl; or a nontoxic, pharmaceutically acceptable salt thereof.
35. The acid having the D configuration in the 7-sidechain and the formula

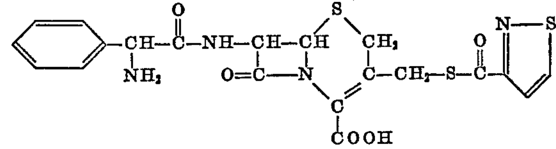

36. The sodium salt of the compound of claim 35.
37. The potassium salt of the compound of claim 35.
38. The zwitterion form of the compound of claim 35.
39. A nontoxic, pharmaceutically acceptable acid addition salt of the compound of claim 35.
40. The pivaloyloxymethyl ester of the acid of claim 35.
41. The acetoxymethyl ester of the acid of claim 35.
42. The methoxymethyl ester of the acid of claim 35.
43. The acetonyl ester of the acid of claim 35.
44. The phenacyl ester of the acid of claim 35.
45. The acid of claim 2 having the D configuration in the 7-sidechain and the formula

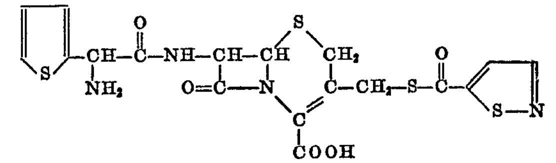

46. The acid of claim 2 having the D configuration in the 7-sidechain and the formula

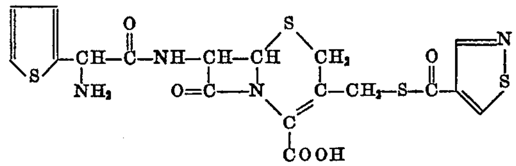

47. The acid of claim 2 having the D configuration in the 7-sidechain and the formula

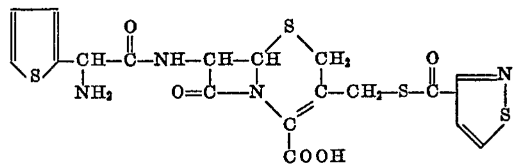

48. The acid of claim 2 having the D configuration in the 7-sidechain and the formula

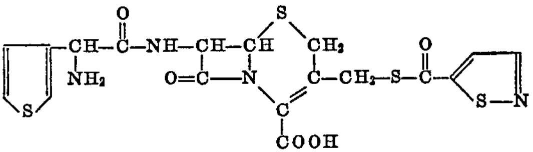

49. The acid of claim 2 having the D configuration in the 7-sidechain and the formula

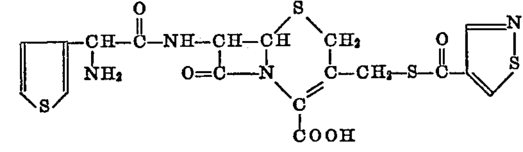

50. The acid of claim 2 having the D configuration in the 7-sidechain and the formula

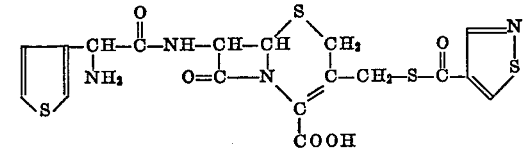

References Cited

UNITED STATES PATENTS 3,641,021 2/1972 Ryan ............ 260—243 C

NICHOLAS S. RIZZO, Primary Examiner

U.S. Cl. X.R.

424—246